H. E. ANGOLD, W. DUDDELL, A. H. DYKES, H. W. HANDCOCK & C. OLIVER.
DISTANCE OPERATED MECHANISM AND SIGNAL CONNECTED TO ELECTRIC SUPPLY SYSTEMS.
APPLICATION FILED MAY 25, 1917.
1,242,756.
Patented Oct. 9, 1917.
2 SHEETS—SHEET 1.
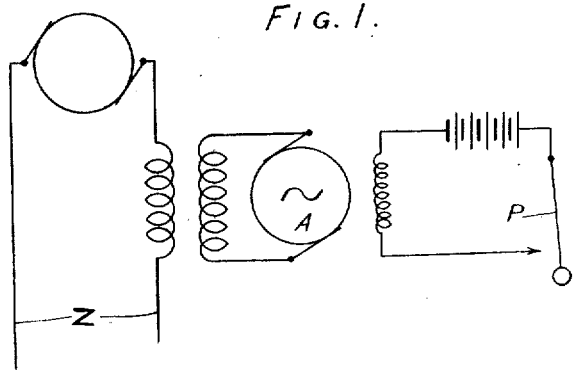
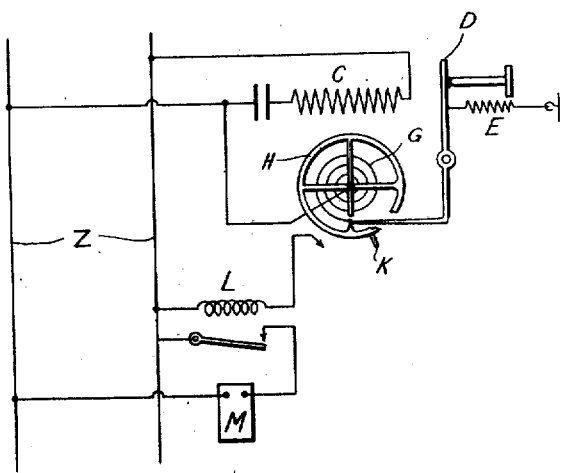
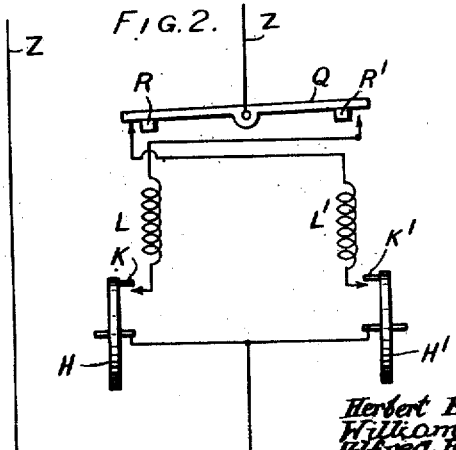
Inventors.
Herbert Edward Angold,
William Duddell,
Alfred Herbert Dykes
Henry William Handcock and
Charles Oliver
by Wilkinson & Giusta
Attorneys.

UNITED STATES PATENT OFFICE.

HERBERT EDWARD ANGOLD, OF ELTHAM, AND WILLIAM DUDDELL, ALFRED HERBERT DYKES, AND HENRY WILLIAM HANDCOCK, OF WESTMINSTER, LONDON, AND CHARLES OLIVER, OF CHISLEHURST, ENGLAND.

DISTANCE-OPERATED MECHANISM AND SIGNAL CONNECTED TO ELECTRIC-SUPPLY SYSTEMS.

1,242,756.          Specification of Letters Patent.          Patented Oct. 9, 1917.

Application filed May 25, 1917. Serial No. 171,080.

*To all whom it may concern:*

Be it known that we, HERBERT EDWARD ANGOLD, electrical engineer, residing at 29 Greenholm road, Eltham, in the county of Kent, England, WILLIAM DUDDELL, consulting engineer, residing at 56 Victoria street, Westminster, London, England, ALFRED HERBERT DYKES, consulting engineer, residing at 11 Victoria street, Westminster, London, England, HENRY WILLIAM HANDCOCK, consulting engineer, residing at 11 Victoria street, Westminster, London, England, and CHARLES OLIVER, electrical engineer, of 3 Shepherds Green, Chislehurst, in the county of Kent, England, all subjects of the King of Great Britain, have invented certain new and useful Improvements in and Connected with Distance-Operated Mechanisms and Signals Connected to Electric-Supply Systems, of which the following is a specification.

In any electric supply circuit, alternating or direct current, the principle of employing the whole circuit, or part of the circuit with an earth return, to convey an electric ripple so as to operate from a control point or points mechanisms or signals at one or more distant controlled points as required, is well known, the apparatus at the controlled point containing as an essential part, a mechanism or coil and condenser tuned to the controlling frequency, this being so different from the frequency of supply that the controlled apparatus will respond to the controlling frequency or frequencies, but not to the normal frequency of the supply circuit.

In endeavoring to turn to practical use on electric supply systems the inventions so far known to us, we have found difficulties, however, as numerous causes contribute to set up ripples of various frequencies, on the one corresponding to the normal frequency of supply. These may happen occasionally to be of the frequency for which the apparatus at a controlled point is tuned, thus causing it to act when not desired to do so.

In order to obviate this difficulty, we have provided in the controlled mechanism two different and essential parts, one electrical—tuned to the control frequency, the other mechanical—so that it only operates when the controlled frequency has been applied at regular intervals, a sufficient number of times, to work a vibrator or pendulum having a period of oscillation corresponding to the rate at which the electrical control ripple is turned on and off the system, the electrical control frequency being different from the mechanical period of oscillation.

In order to make this clear, suppose that at an electric supply station, arrangements are made to superpose a control ripple having a frequency $f$, there being a condenser and coil in the controlled apparatus tuned to that frequency. If this coil actuates a pendulum each time that ripple is applied, it is evident that if the ripple $f$, be put on and off at successive time intervals corresponding to $x$, the period of a complete oscillation of the pendulum, then this process performed at the control point will cause the pendulum at the controlled point to set up a swing, which may be utilized to close a circuit of a relay, and thus perform any desired work, or to actuate a signal of some sort.

With this arrangement, it is practically impossible for the distant controlled mechanism to be operated electrically by accidental causes. In certain cases however, local causes at the controlled point may cause the pendulum to start swinging without receiving the predetermined electric impulse from the control point. In order to obviate this difficulty when it arises, we substitute for the pendulum the well known arrangement of a balance wheel on a spindle, controlled by a spiral spring, so as to have a period of oscillation, $x$. This combination is found to obviate the latter difficulty and in this form it may be described briefly, subject to the more detailed description contained herein, as consisting of an appliance at a control point or points, by which a series of electric ripples are set up of frequency $f$, at equal time intervals corresponding to $x$, these ripples being transmitted wholly over an electric supply circuit or partly over an electric supply circuit and back through earth, so as to operate at one or more controlled points an electro-magnet or coil and condenser in resonance at frequency $f$, which convey impulses to a balance wheel tuned to oscillate with a time interval $x$, so that on attaining a predetermined amplitude it makes an electric contact so as to operate a relay or give a signal. Or it may give the signal by its movement, without making an electric contact.

Obviously this arrangement is capable of various developments. It may simply cause an electric lamp to flash or give a signal in some other way each time the balance wheel completes the electric circuit locally, or if the act of making contact works a relay, that relay may close an electric circuit such as an electric street lamp or a meter circuit.

A second balance wheel or pendulum may be provided, tuned so as to oscillate in response to impulses applied at the controlling point at a different time interval $x^1$. This, when in oscillation, makes a contact which may be utilized to reverse the operation of the relay, extinguishing the lamp before referred to, for instance, or altering the meter connections so as to make the meter register at a different rate, or on another dial, or the like. The electric resonance apparatus conveying the impulse to this second balance wheel may also be tuned for a different frequency $f^1$. Obviously for various purposes various combinations of different frequencies $f$ with different time intervals $x$ may be employed.

We find that we can vary the method of conveying the impulse to the balance wheel, depending on the commercial degree of exactitude required. If this be not great, we cause the impulse from the coil, which need not be tuned too sharply, to be conveyed direct to the balance wheel, when even if there be some variation in $f$ or $x$, the apparatus can still be made to work by increasing the amplitude of the ripple. In cases, however, where we wish to insure greater accuracy or to use a number of different time intervals $x$, $x^1$, $x^2$, a finer degree of exactitude in selection is necessary so that the balance wheel should respond within practical limits only to impulses applied at the time intervals to which it is tuned. To obtain this exactitude a good number of impulses is desirable, in order to bring the wheel up to its full amplitude as otherwise if a small number only were sufficient, it would be affected by impulses which may be applied at periods differing but little from that to which it is tuned. For instance, a wheel tuned to make 160 oscillations per minute would only be ¼ of a period out of step at the end of 10 impulses if the latter were applied at the rate of 164 per minute.

To make certain that the wheel will not reach its full amplitude unless it has received a definite number of impulses it is necessary that the impulses conveyed to it shall be fairly even and not exceed a definite value. To obtain this we convey the impulse not direct to the wheel but through the spring controlling it by a reciprocating armature and we limit the travel of the latter in both directions, backward and forward so that whatever the variation in the strength of the impulse imparted to the armature the amount of movement transmitted to the spring and consequently the impulse conveyed to the wheel through the spring remain practically constant.

Where a pendulum is used instead of a balance wheel the impulse may be also conveyed through a spring.

We also find it useful to install at the control point, or points, one pilot controlled apparatus or more, so as to enable the operator to perceive if and when anything has occurred on the circuit purposely or otherwise to cause the corresponding distant controlled apparatus to operate.

Figure 1 is a diagrammatic view of the system illustrating one form of apparatus constructed in accordance with the present invention.

Fig. 2 is a diagrammatic view of one form of circuit breaking device.

Fig. 1, illustrates one of the ways in which our invention may be put into effect. A is an alternator of frequency $f$, whch through a transformer impresses a ripple on the public supply mains Z, at the control point at the generating station or possibly at a substation. A is excited in any suitable manner, the field being made or broken by a pendulum P, or the like, having a swing of time interval $x$. The same result may be produced in other ways, such as causing the pendulum to short the field, for instance, when it is desirable to adopt any of the well known means to obviate "shorting" the source of energy for the field excitation at the same time, such as by the insertion of a further resistance in the circuit.

Where deemed advisable, the field spark may also be suppressed by any well known means and a relay may be inserted between the pendulum and the field circuit.

Figure 3:
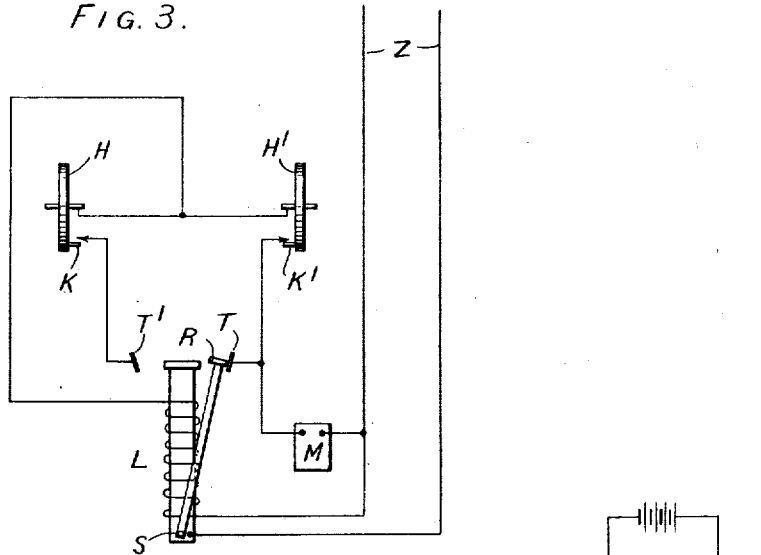
Fig. 3 is a similar vew of a modified form of circuit breaking device.

At the controlled point, C is a circuit, tuned to the frequency $f$. The coil or electro-magnet in C is provided with a pivoted armature D, held off against a stop by the spring E. The opposite end of D is connected to the end of the spring G, which controls the wheel H through the arbor on which it is mounted so that H has a period of oscillation $x$. A and C have the same frequency and P and H the same period of oscillation. The arbor of H, is connected in any suitable manner, say through its pivots or spring to one of the supply mains.
On the rim of H is a contact pin K, so that when the amplitude of swing of H is sufficient it makes contact with a projecting arm and so energizes the electro-magnet L, from the supply circuit. It is obvious that if a ripple of frequency $f$ is impressed on the supply mains, made and interrupted by P at time intervals $x$, the electromagnet in C will attract and release D at time intervals $x$, conveying an impulse through G to H and thus causing it to oscillate. When H has attained a swing of sufficient amplitude the contact K will close the circuit and energize L which may thus be caused to do any useful work required such as lighting a public lamp M, changing the manner of record of a meter, or the like. In Fig. 2 is shown a device to prevent sparking at the contact K or in the immediate locality of the wheel H.
Q is a conducting arm pivoted at the center and provided with any well known device to hold it over when attracted through the armature R or $R^1$ to one side or the other. When $R^1$ has been attracted by $L^1$ it remains over, leaving L connected to the mains, and further circuit through contacts $K^1$ is impossible. On H oscillating and making contact through K, L attracts R dragging Q over in the opposite direction throwing L out of circuit and throwing $L^1$ in, continued oscillations of H after the first contact making no electrical circuit through contact K. The various parts must be so arranged as to have time constants such that contacts are broken by Q before they are broken at K or $K^1$. Evidently Q can be made by the same operation to extinguish or light a lamp or do anything else that may be required.
We may also, when found desirable, utilize one magnet L to perform the function of switching on and off, or the like, in the place of L and $L^1$. Fig. 3 indicates how this may be done.
In this Fig. 3, the electro-magnets L and $L^1$ are replaced by an electro-magnet L, the armature R being carried on an arm so as to swing radially about the center S. If, for instance, it is in the position shown in Fig. 3 resting against and touching the contact T, when L is excited R is attracted toward L and moves about the center S. Immediately it is attracted forward, however, it breaks the circuit, thus deënergizing L: but the impetus that it has received carries it over the dead center and it finally rests against the contact $T^1$, in position ready to be drawn back by L over to T when H oscillates, making contact through K at $T^1$. The contact T in this case is also used to make the electrical circuit through the public lamp M or other apparatus which it is desired to operate.

Figure 4:
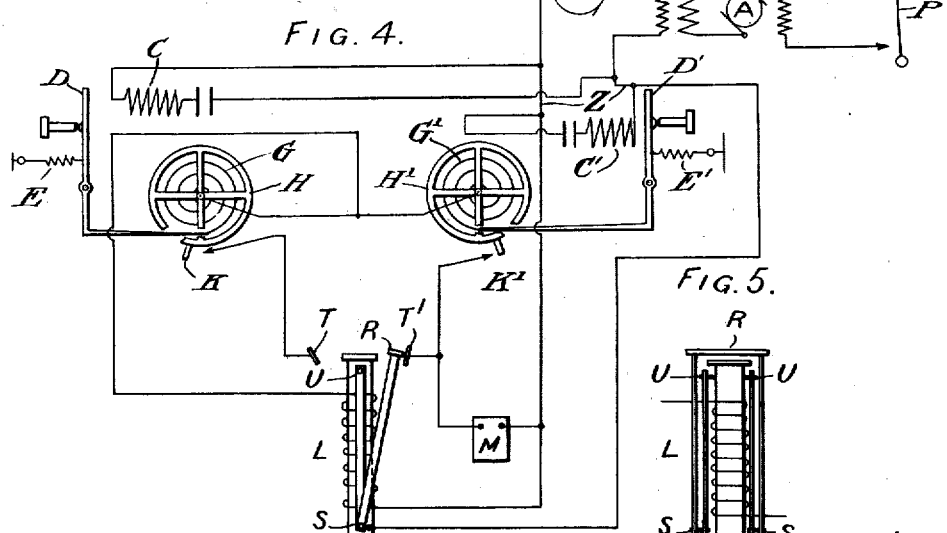
Fig. 4 is a view similar to Fig. 3 with a modified form of armature support.
Figure 5:
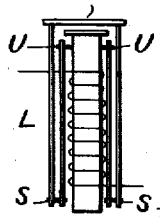
Fig. 5 is an enlarged fragmentary end elevational view of the electromagnet and armature shown in connection with the device illustrated in Fig. 4.

We find that if S is a rigid pivot, there is a danger of R remaining in an upright position immediately over the core of the magnet. For this reason, the pivot S instead of being made stable, is fixed to a loose arm pivoted at U, as shown in Fig. 4, so that when the arm carrying R is immediately vertical, S being unstable, R is in a state of unstable equilibrium and thus falls over against T or $T^1$, as the case may be. In this Fig. 4 the oscillator $H^1$ carries the contact $K^1$ and is actuated through the volute spring $G^1$ from the armature $D^1$. An electro-magnet $C^1$, connected across the mains Z, controls the vibration of said armature $D^1$ which is under the yieldable restraint of the coil spring $E^1$. Fig. 5 is a side view of the magnet L, Fig. 4.

We exclude from our claims any applications of this invention in which the transmission of the controlling ripple wholly or partly through a public electric supply system does not form part.

Having now particularly described and ascertained the nature of our said invention and in what manner the same is to be performed, we declare that what we claim is:—

1. In an apparatus of the character described, the combination of control and controlled stations, a generator at the control station, a device at said control station for regulating the periodic transmission of impulses from said generator, electromagnetic means at the controlled station energized by said generator, an armature actuated by said electromagnetic means, an oscillator at the controlled station independent and distinct from said armature, and means for connecting said oscillator and armature to vibrate the former from the latter, substantially as described.

2. In an apparatus of the character described, the combination of control and controlled stations, a generator at the control station, a device for controlling the periodic transmission of impulses from said generator, electromagnetic means at said controlled station, an armature under the influence of said electromagnetic means, an oscillator at the controlled station separate and independent from said armature, and a mechanical connection coupling said oscillator and armature to vibrate the former with the same periodic motion as said device, substantially as described.
3. In an apparatus of the character described, the combination of control and controlled stations, a generator at the control station, means for periodically transmitting impulses from said generator to the controlled station, electromagnetic means at the controlled station tuned to respond to the frequency of said generator, an armature under the influence of said electromagnetic means, an oscillator at said controlled station distinct from said armature, a resilient connection between said oscillator and armature, and a local circuit adapted to be closed by the said oscillator, substantially as described.

4. In an apparatus of the character described, the combination of control and controlled stations, a generator at the control station, means for controlling the periodic transmission of impulses from said generator, a receiving coil at the controlled station adapted to be energized from said generator, an armature adapted to vibrate under the influence of said receiving coil, an oscillator at said controlled station separate from said armature, a local circuit adapted to be closed by said oscillator on attaining a predetermined amplitude of vibration, and a coil spring for connecting said oscillator and armature, substantially as described.

5. In an apparatus of the character described, the combination of control and controlled stations, a generator at the control station, a device for regulating the periodic transmission of impulses from said generator, electromagnetic means at the controlled station for receiving such impulses, an armature adapted to vibrate under the influence of said electromagnetic means, an oscillator at the controlled station, means connecting said oscillator and armature, a local circuit at the controlled station, a contact carried by said oscillator for closing said local circuit, and means for interrupting said local circuit independently of said oscillator, substantially as described.

6. In an apparatus of the character described, the combination of control and controlled stations, a generator at the control station, a device for controlling the periodic transmission of impulses from said generator, electromagnetic means at the controlled station for receiving such impulses, armatures adapted to vibrate under the influence of said electromagnetic means, oscillators at the controlled station distinct from said armatures, means for connecting said oscillators and armatures, local circuits at the controlled station, contacts carried by said oscillators for closing said local circuits, and means for interrupting said local circuits after the same have been closed by said contacts, substantially as described.

7. In an apparatus of the character described, the combination of control and controlled stations, a generator at the control station, a device for controlling the periodic transmission of impulses from said generator, electromagnetic means at the controlled station, armatures adapted to vibrate under the influence of said electromagnetic means, oscillators at the controlled station having the same vibration period with said device, means for connecting said oscillators and armatures, local circuits at the controlled station, contacts carried by said oscillators for closing said local circuits, and means for interrupting said local circuits after the same have been closed by said oscillators including an electromagnet, an armature vibrating under the influence of said electromagnet, and opposed contacts adapted to be engaged by said last-named armature, substantially as described.

8. In an apparatus of the character described, the combination of control and controlled stations, a generator at the control station, a device for controlling the periodic transmission of impulses from said generator, electromagnet means at the controlled station, armatures adapted to vibrate under the influence of said electromagnetic means, oscillators at the controlled station having the same vibration period with said device, means for connecting said oscillators and armatures, local circuits at the controlled station, contacts carried by said oscillators for closing said local circuits, and means for interrupting said local circuits after same have been closed by said oscillators including an electromagnet, an arm pivoted at its upper end, an armature pivoted to the lower free end of said arm, and opposed contacts in said local circuits adapted to be engaged by said last-named armature, substantially as described.

HERBERT EDWARD ANGOLD.
WILLIAM DUDDELL.
ALFRED HERBERT DYKES.
HENRY WILLIAM HANDCOCK.
CHARLES OLIVER.